(No Model.) 2 Sheets—Sheet 1.
J. F. HENDRICKSON.
DRILL CHUCK.
No. 577,656. Patented Feb. 23, 1897.
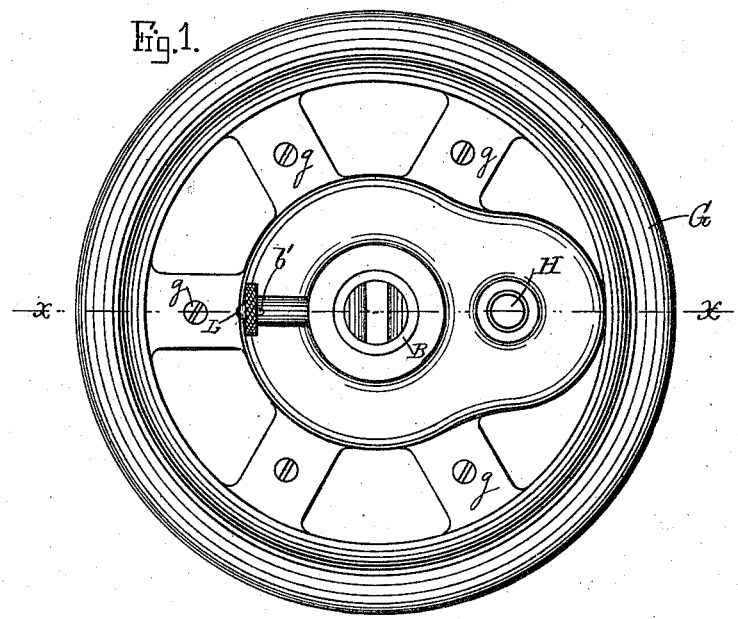
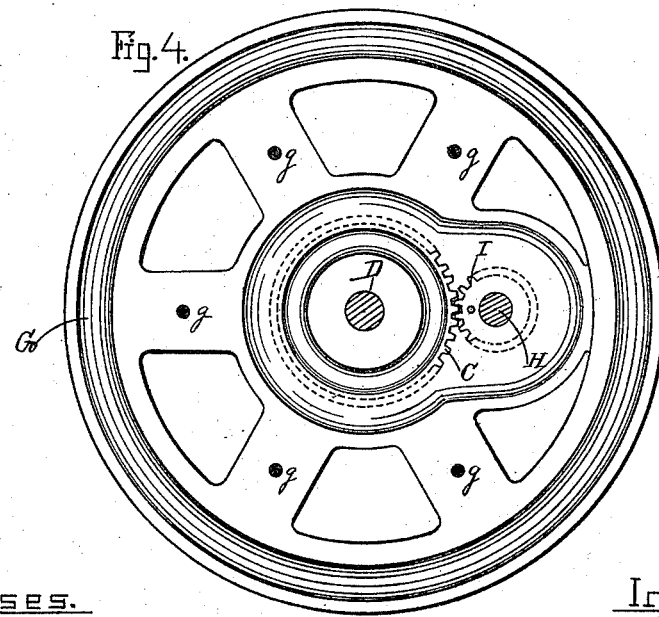
Witnesses.
Lauritz N. Möller
Charles A. Harris
Inventor
John F. Hendrickson
by J. Van Andren
his atty.

(No Model.) 2 Sheets—Sheet 2.

J. F. HENDRICKSON.
DRILL CHUCK.

No. 577,656. Patented Feb. 23, 1897.

Witnesses
Lauritz N. Möller
Charles A. Harris

Inventor
John F. Hendrickson
his atty.

UNITED STATES PATENT OFFICE.

JOHN F. HENDRICKSON, OF BOSTON, MASSACHUSETTS.

DRILL-CHUCK.

SPECIFICATION forming part of Letters Patent No. 577,656, dated February 23, 1897.

Application filed May 8, 1896. Serial No. 590,758. (No model.)

*To all whom it may concern:*

Be it known that I, JOHN F. HENDRICKSON, a citizen of the United States, and a resident of Boston, in the county of Suffolk and State of Massachusetts, have invented new and useful Improvements in Drill-Chucks, of which the following, taken in connection with the accompanying drawings, is a specification.

This invention relates to improvements in drill-chucks for the purpose of adjusting at will the speed of a drill in a drilling-machine relative to the spindle of such machines; and it is carried out as follows, reference being had to the accompanying drawings, wherein—

Figure 2:
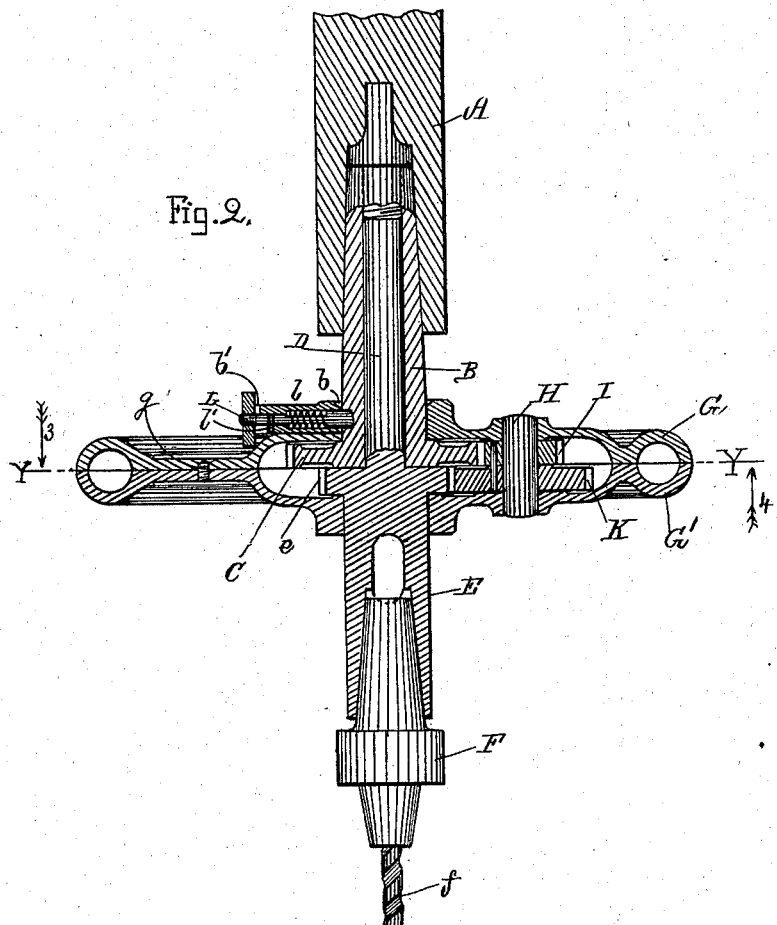
Figure 3:
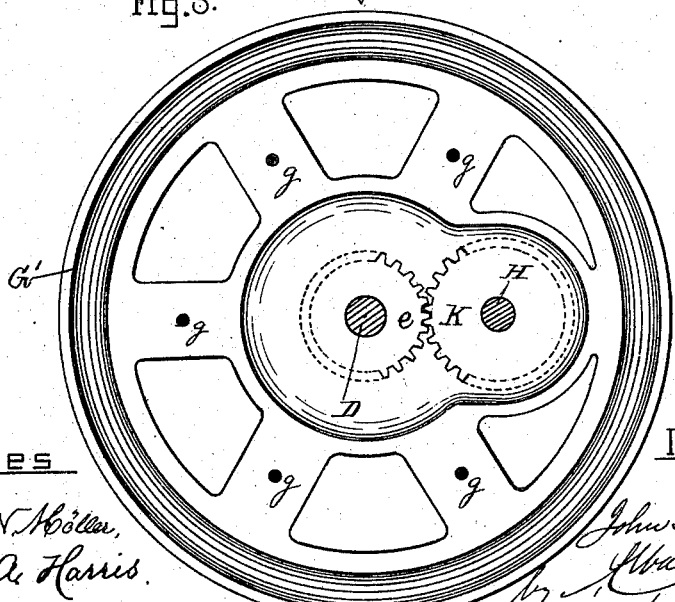

Figure 1 represents a top plan view of the device. Fig. 2 represents a central longitudinal section on the line X X shown in Fig. 1. Fig. 3 represents a horizontal section on the line Y Y in Fig. 2 as seen in the direction of the arrow 3 in said Fig. 2, and Fig. 4 represents a similar section on said line Y Y in Fig. 2 as seen in the direction of the arrow 4 in said Fig. 2.

Similar letters refer to similar parts wherever they occur on the different parts of the drawings.

A in Fig. 1 represents the socketed drilling-machine spindle of a drilling-machine, as usual, to which a rotary motion is imparted by any suitable mechanism.

B represents a hollow tapering shank adapted to be inserted and secured within the socket of the spindle A, as shown in Fig. 1.

To the lower end of the shank B is attached or made in one piece with it a spur-gear C. (Shown in Figs. 2 and 4.)

In the hollow shank B is journaled the spindle D, having its lower end extended downward as a chuck-holding shank E, in which the chuck F is secured, as shown in Fig. 2. *f* is a drill, as usual, adapted to be secured to the chuck F during the drilling operation. Attached to the shank E or made in one piece with it is a pinion *e*, as shown in Figs. 2 and 3.

Loosely journaled on the shank B and shank E is a divided hollow hand-wheel G G', secured together by means of screws *g g*, as shown in the drawings.

Within the hollow hand-wheel G G' is arranged on a spindle H, which is journaled in bearings in said hand-wheel, a pinion I, the teeth of which mesh in the teeth of the larger gear-wheel C, which is attached to the shank B. Attached to said pinion I is a gear-wheel K, the teeth of which mesh in the teeth of the gear-wheel *e*, attached to the chuck-holding shank E, as shown in Figs. 2 and 3.

From the above will be seen that an increased rotary motion is imparted to the shank E, its chuck, and drill from the rotary drilling-machine spindle A if the hand-wheel G G' is held stationary by the operator during the revolution of the said rotary drilling-machine spindle A, and this is accomplished by the intermediate gears C, I, K, and *e*, as above described.

In a horizontal recess in the hand-wheel portion G is horizontally adjustable a spring-pressed locking-pin L, the inner end of which is adapted to interlock with a notch or recess *b* on the shank B, as shown in Fig. 2, and when so interlocked the chuck-holding shank E is caused to rotate with the same speed as the drilling-machine spindle A.

If it is desired to disconnect the locking-pin L from the shank B, it is only necessary to pull it outward against the influence of its spring *l*, so as to cause its pin *l'* to be interlocked in a recess *b'*. (Shown in Fig. 2.) Any other suitable locking and disconnecting device for connecting the hand-wheel G G' to and from the shank B may be used without departing from the essence of my invention.

Should the operator desire at any time to stop the rotation of the chuck F and its drill without stopping the rotation of the drilling-machine spindle, as may be needed in shifting the drill, it is only necessary to release his hold on the hand-wheel G G' and grasp the shank E or its chuck F, thus causing the drill to be held stationary.

The invention, although especially designed for drilling purposes, as above stated, may to equal advantage be used as a cut-off coupling for shafting by simply using the hand-wheel as a pulley and provide it with a suitable brake mechanism to take the place of the holding of said wheel by the hand of the operator.

Having thus fully described the nature, construction, and operation of my invention, I wish to secure by Letters Patent and claim—

In a drilling-machine a rotary drilling-machine spindle combined with a shank B attached to the same, and provided with a gear C, a chuck or drill holding shank E loosely journaled in said shank B and a gear $e$, attached to said shank E, a hand-wheel G, G', or pulley journaled on the shanks B, E, gears I, K, intermeshing respectively with the gears C, $e$, and a locking device for attaching and detaching the hand-wheel to and from the shank B, substantially as and for the purpose set forth.

In testimony whereof I have signed my name to this specification, in the presence of two subscribing witnesses, on this 11th day of April, A. D. 1896.

JOHN F. HENDRICKSON.

Witnesses:
ALBAN ANDRÉN,
LAURITZ N. MÖLLER.